United States Patent

[11] 4,324,545
[45] Apr. 13, 1982

Hubbert

[54] RECIRCULATING HEATER FOR PROCESSING OVEN

[75] Inventor: Gordon F. Hubbert, Plymouth, Mich.
[73] Assignee: Gladd Industries, Inc., Detroit, Mich.
[21] Appl. No.: 189,483
[22] Filed: Sep. 22, 1980
[51] Int. Cl.³ .............................................. F24H 1/00
[52] U.S. Cl. .................................. 432/223; 431/116; 432/72; 432/222
[58] Field of Search ................ 432/72, 219, 222, 223; 431/116

[56] References Cited

U.S. PATENT DOCUMENTS

| | | | |
|---|---|---|---|
| 2,985,438 | 5/1961 | Prowler | 432/223 |
| 3,146,821 | 9/1964 | Wuetig | 432/47 |
| 3,604,824 | 9/1971 | Hardison | 432/72 |
| 4,098,567 | 7/1978 | Hubbert | 432/72 |
| 4,255,132 | 3/1981 | Carthew | 432/72 |

*Primary Examiner*—John J. Camby
*Attorney, Agent, or Firm*—Reising, Ethington, Barnard, Perry & Brooks

[57] ABSTRACT

A recirculating processing oven heater (10) disclosed includes first and second flow paths (22,26) with an internal heat exchanger (36) located downstream from a burner (24) and upstream from a conical mixing member (28) that deflects gas from the first path outwardly for mixing with bypass gas that flows along the second path. Thermal incineration of unburned combustible gases takes place along the first path (22) after heating thereof by the burner and prior to passage thereof through the internal heat exchanger (36). Heat extracted by the internal heat exchanger (36) is supplied to the upstream end of one of the flow paths (22,26), preferably the first flow path (22) so as to provide most efficient operation of the heater. An internal control valve (58) positioned between the internal heat exchanger (36) and the mixing member (28) along the first path controls the relative rate of gas flow along each path under the impetus of a suction blower (34) within a mixing chamber (32) downstream from the mixing member. A fresh air inlet (62) to the mixing chamber (32), an exhaust gas outlet (64) adjacent the internal control valve (58), and a secondary heat exchanger (70) with an associated control valve (78) coupled to the internal control valve (58) cooperate to provide efficient operation of the heater.

12 Claims, 2 Drawing Figures

RECIRCULATING HEATER FOR PROCESSING OVEN

TECHNICAL FIELD

This invention relates to a recirculating heater for use with processing ovens such as paint ovens, and ovens for meat processing systems, etc.

BACKGROUND ART

A recirculating processing oven heater disclosed by U.S. Pat. No. 4,098,567, which is assigned to the assignee of the present invention, incorporates a catalytic converter downstream from a direct fired burner so as to remove unburned combustible gas components from the processing gas while providing additional heating thereof prior to delivery to an associated oven. This heater includes an inner housing defining a first gas flowing path along which the burner and catalytic converter are disposed and an outer housing that cooperates with the inner housing to define a second gas flow path along which bypass processing gas flows without any direct heating thereof by the burner. A mixing chamber defined by the outer housing portion is located downstream from a conical mixing member that points upstream toward the catalytic converter at the downstream end of the first gas flow path so as to deflect gas outwardly and thereby provide mixing of the gas flowing along the two paths. Such a heater construction allows the gas passing through the catalytic converter to be in the range of about 600° to 1200° F. so that effective catalytic operation takes place while still delivering heated processing gas after mixing in a lower more usable range of about 150° to 500° F.

U.S. Pat. No. 3,604,824 discloses a thermal incineration unit which incorporates dual flow paths as well as a heat exchanger downstream from the heater burner so as to remove heat from the gas after the gas has been at a sufficiently high temperature for a sufficient period of time for thermal incineration to remove combustible pollutants from the gas.

U.S. Pat. No. 2,985,438 discloses combustion apparatus including a first gas flow path along which the burner thereof is disposed and second and third bypass gas flow paths concentric with and located outwardly of the first path. At the downstream end of the three flow paths, adjustable louvers deflect heated gas from the first path outwardly toward bypassed gas that flows along the second and third paths in order to provide mixing of the gas within a downstream mixing chamber.

U.S. Pat. No. 3,146,821 discloses a furnace heater including burner and bypass gas flow paths as well as a heat recuperator which removes heat from return gases and supplies this heat to the gas that flows through both the burner and bypass paths.

DISCLOSURE OF INVENTION

An object of the present invention is to provide an improved recirculating heater for processing ovens with an internal heat exchanger such that combustible gases are removed by thermal incineration while still delivering heated gas at a usable temperature substantially lower than the temperature required for the thermal incineration.

In carrying out the above object, the recirculating heater including the internal heat exchanger has an elongated outer housing and an elongated inner housing received within the outer housing in a spaced relationship thereto so as to define a first gas flow path while cooperating with the outer housing to define a second gas flow path between the housings. A burner at the upstream end of the inner housing along the first path provides heating of gas flowing therealong to a sufficiently high temperature such that thermal incineration of combustible gases takes place. A mixing member of a conical shape is located at the downstream end of the inner housing and points upstream toward the burner so as to deflect gas flowing along the first path outwardly toward gas flowing along the second path. A mixing chamber defined by the outer housing downstream from the conical mixing member receives a blower that draws gas through both paths. The internal heat exchanger is located within the inner housing between the burner and the conical mixing member and extracts heat from the gas flowing therealong after thermal incineration of the combustible gases has occurred. A supply conduit delivers the heat extracted by this heat exchanger to the upstream end of one of the flow paths. Combustible pollutants are thus removed by the thermal incineration while still providing heated gas delivered from the heater at a lower usable temperature than that required for the thermal incineration.

In the preferred construction disclosed, the internal heat exchanger heats return gases from the associated oven and supplies this heated gas to the upstream end of the first gas flow path adjacent which the heater burner is positioned. Return gases from the oven are also fed from the oven to the upstream end of the second gas flow path.

A control valve is also preferably provided along the first flow path between the internal heat exchanger and the conical mixing member so as to control the relative gas flow rates along the first and second flow paths. Opening of this control valve decreases the flow resistance along the first flow path such that a greater amount of gas is drawn by the blower past the burner. Closing of this control valve increases the flow resistance along the first path so as to decrease the gas flow rate along the first flow path.

A fresh air inlet and an exhaust gas outlet of the heater provide replacement of the processing gas. The fresh air inlet is located at the mixing chamber and has an associated control valve for controlling the amount of fresh air introduced. The exhaust gas outlet for removing gas is located along the first flow path adjacent the control valve therealong and preferably has an annular shape within which this control valve is received. Upon opening of the control valve along the first flow path, a decreased amount of exhaust gas is fed through the outlet thereabout and upon closing thereof an increased amount of exhaust gas is fed through the outlet.

A secondary heat exchanger of the heater is provided for extracting heat from the exhaust gases that flow outwardly through the outlet and for supplying this extracted heat to the fresh air supplied through the inlet at the mixing chamber. A bypass conduit of the heater feeds fresh air to the inlet without receiving extracted heat from the secondary heat exchanger, and a control valve controls the flow of fresh air through the secondary heat exchanger and the bypass conduit in accordance with the heat output required by the heater. A suitable coupling interconnects the control valve along the first flow path within the inner housing and the control valve associated with the secondary heat exchanger in order to coordinate the operation of these control valves.

A central baffle and at least one annular baffle spaced along the first flow path between the burner and the internal heat exchanger provide a somewhat tortuous path so that good mixing of the gas flow therealong takes place such that all of this gas is at a sufficiently high temperature for an adequate dwell time for incineration of the combustible gases to take place prior to passing through the internal heat exchanger. As disclosed, a pair of the annular baffles are provided with the central baffle located axially therebetween along the length of the first gas flow path between the burner and the internal heat exchanger. After the thermal incineration, the gas passes through the internal heat exchanger along the first path and its temperature is thus lowered prior to mixing with the gas flowing along the second path and/or exhaustion through the outlet.

In its most preferred construction, the outer and inner housings have round cross sections with a concentric relationship also concentric with the axis of the conical mixing member at the downstream end of the inner housing. At the upstream end of the outer and inner housings, a wall of a generally annular shape extends between the housings to divide the upstream ends of the first and second gas flow paths. Control valves respectively associated with the first and second gas flow paths at the upstream ends thereof control the rate of gas flow through the heater. The control valve at the upstream end of the first gas flow path controls the extent of gas introduced thereto with the extracted heat from the internal heat exchanger, while the control valve at the upstream end of the second gas flow path controls the gas flow rate of return gas received from the associated oven.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
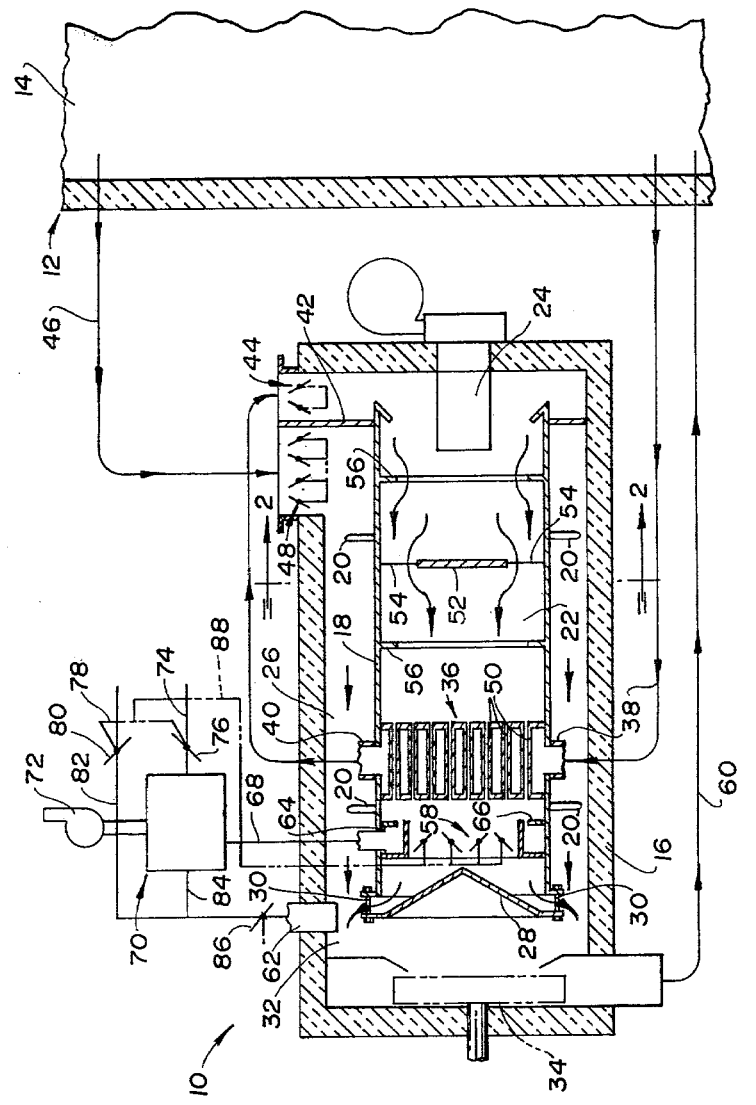
FIG. 1 is a schematic view taken partially in section through a processing oven and a recirculating heater therefor constructed in accordance with the present invention.
Figure 2:
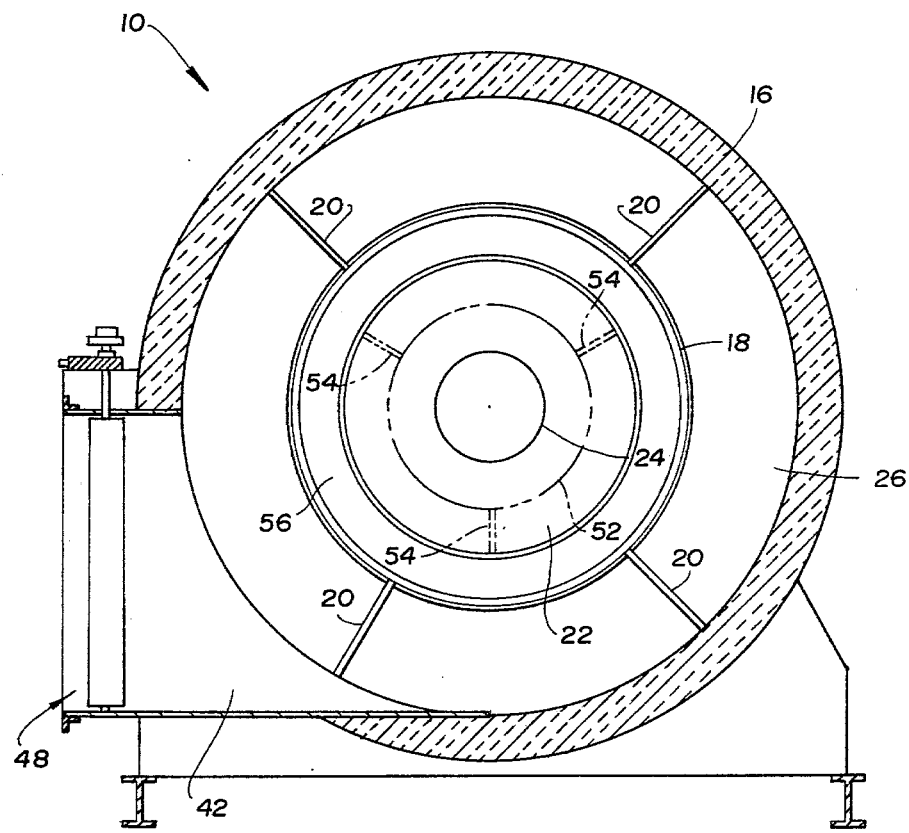
FIG. 2 is a cross sectional view through the heater taken along line 2—2 of FIG. 1.

Referring to the drawings, a recirculating heater 10 constructed in accordance with the present invention provides heating of processing gas for an associated oven 12 whose heating chamber in which the processing takes place is designated by 14. Heater 10 includes an elongated outer housing 16 of an insulated construction with a round cross section between its opposite ends. An elongated inner housing 18 of the heater is received within the outer housing 16 and is supported by rods 20 in a spaced relationship to the outer housing. Inner housing 18 has a round cross section and is positioned coaxial with the outer housing 16. A first gas flow path 22 is defined by the inner housing 18 between its upstream right end and its downstream left end, as viewed in FIG. 1, such that gas flowing therealong is heated by a direct fired burner 24 supported on the outer housing 16 adjacent the upstream end of the inner housing. A second gas flow path 26 is defined by the outer and inner housings 16 and 18 and has an annular cross section along which bypass gas flows without being directly heated by the burner 24. A conical mixing member 28 is mounted by circumferentially spaced bolt supports 30 on the downstream end of the inner housing 18 and points upstream toward the burner 24 such that gas flowing along the first path 22 is deflected outwardly for mixing with the gas flowing along the second path 26. Outer housing 16 defines a mixing chamber 32 in which a suction blower 34 is received so as to draw gas through the heater in a manner which is hereinafter more fully described.

As seen in FIG. 1, an internal heat exchanger 36 of heater 10 is located within the inner housing 16 along the first gas flow path 22 spaced downstream from the burner 24 and upstream from the mixing member 28. A feed conduit 38 supplies gas from the heating chamber 14 to the internal heat exchanger 36 for heating of this gas by heat which is extracted from the gas flowing along the first flow path 22. A supply conduit 40 feeds the gas with the extracted heat to the upstream end of one of the gas flow paths. As shown, the conduit 40 preferably feeds the upstream end of the first flow path 22 adjacent a wall 42 that extends between the outer and inner housings 16 and 18 to divide the flow paths. A control valve 44 controls the flow of gas from the conduit 40 through the upstream end of the first flow path 22. Another supply conduit schematically indicated by 46 supplies return gases from the oven heating chamber 14 to the upstream end of the second flow path 26 at which a control valve 48 is located. Suitable manual or power operated actuators control the operation of the valves 44 and 48 to provide proper operation of the heater 10.

Provision of the internal heat exchanger 36 permits the gas flowing along the first path 22 to be heated by the burner to a sufficiently high temperature such that thermal incineration of combustible gases takes place while still delivering gas of a much lower temperature from the heater by both the extraction of heat by the internal heat exchanger and the bypass of gas through the second flow path 26. The gas flowing from the burner 24 toward the internal heat exchanger 36 should be in the temperature range of 1000° to 1400° F. for a dwell time of greater than 0.3 seconds in order for the thermal incineration of the combustible gases to take place. Preheating of the gas supplied to the first gas flow path 22 by the extraction of heat achieved with the internal heat exchanger 36 lessens the heat input that must be supplied by the burner 24 as the gas initially enters the first gas flow path 22. After the gas flows through tube openings 50 of the heat exchanger 36, its temperature is decreased by the heat extracted therefrom prior to being deflected by the mixing member 28 in an outward direction for mixing with the gas flowing along the second flow path 26.

A central baffle 52 is supported by circumferentially spaced rods 54 between the burner 24 and the internal heat exchanger 36 and deflects centrally flowing gas outwardly therearound during operation of the heater. At least one annular baffle 56 is also provided to deflect gas flowing along the inner surface of the inner housing 18 inwardly. Two of the annular baffles 56 are preferably utilized, one upstream from the central baffle 52 and downstream from the burner 24 and the other downstream from the central baffle and upstream from the internal heat exchanger 36. Baffles 52 and 56 cooperate to provide a tortuous path for the gas flowing along the first flow path 22 in order to ensure effective mixing thereof and complete incineration of the combustible gases during the dwell time between the burner 24 and the internal heat exchanger 36.

A control valve 58 of the heater is shown in FIG. 1 located along the first gas flow path 22 between the internal heat exchanger 36 and the conical mixing member 28 and controls the relative rates of gas drawn along the first and second flow paths by the suction blower 34. Opening of the control valve 58 provides a greater percentage of gas flow through the first gas flow path 22 while closing of this valve provides an increased percentage of bypass gas flow along the second flow path 26. Since only gas flowing along the first path 22 passes by the burner 24, control valve 58 thus controls the extent of heat input to the gas which is mixed within the chamber 32 and ultimately supplied by the blower 34 through a schematically indicated conduit 60 to the oven heating chamber 14. When a greater amount of heat is required in the heating chamber 14, the control valve 58 is thus opened so that the gas supplied by the heater has a greater temperature. Conversely, when less heat is required by the heating chamber 14, the control valve 58 closes so that the gas supplied by the heater to the heating chamber has a lower temperature.

Heater 10 also includes a fresh air inlet 62 at the mixing chamber 32 for introducing a selected percentage of fresh air such as on the order of 5 to 15 percent during operation of the heater. An exhaust gas outlet 64 of the heater is located along the first gas flow path 22 adjacent the control valve 58 and preferably has an annular shape in which this control valve is received. An annular opening 66 of outlet 64 receives gas flowing along the first flow path 22 after passage thereof through the internal heat exchanger 36 and this gas is delivered through an exhaust conduit 68 outwardly from the heater housings. Opening of the control valve 58 decreases the relative percentage of gas which is exhausted through outlet 64 in relationship to the gas which flows through the control valve. Conversely, closing of the control valve 58 increases the percentage of gas which is exhausted through the outlet 64 in relationship to the gas which flows through the control valve.

Heater 10 additionally includes a secondary heat exchanger 70 for extracting heat from the exhaust gases supplied thereto by the exhaust conduit 68. A suction blower 72 draws the exhaust gases outwardly through the outlet 64, conduit 68, and the secondary heat exchanger 70. An inlet 74 for gas to be heated by the secondary heat exchanger 70 is controlled by one damper 76 of a control valve 78 whose other damper 80 controls gas flow through an inlet bypass conduit 82. An outlet 84 from the secondary heat exchanger 70 and the bypass conduit 82 both feed the fresh air inlet 62 under the further control of an adjustable valve 86. Operation of the control valve 78 either closes the damper 76 and concomitantly opens the damper 80 or opens the damper 76 and concomitantly closes the damper 80. Closing of the damper 76 and the concomitant opening of the damper 80 provides bypass fresh air to the fresh air inlet 62 when a lesser amount of heat is required. Conversely, when a greater amount of heat is required, opening of the damper 76 and closing of the damper 80 feeds fresh air through the secondary heat exchanger so as to extract heat from the gases exhausted through the outlet 64 in order to salvage the heat thereof and provide preheating of the fresh air fed to the fresh air inlet 62.

Control valve 58 along the first flow path 22 and the control valve 78 associated with the secondary heat exchanger 70 have a suitable coupling indicated schematically at 88 for coordinating the operation of these valves. This coupling is preferably embodied by a suitable electric or pneumatic circuit that coordinates the operation of valves 58 and 78 in response to the heat input required by the oven heating chamber; however, the coupling may also take other mechanical forms and still operate in response to the same input. Maximum heat output is provided with valve 58 open and valve 78 having its damper 76 open and its damper 80 closed so that the secondary heat exchanger 70 extracts heat from the exhaust gases and supplies this heat to the fresh air introduced through inlet 62. Closing of valve 58 while maintaining valve 78 so that the secondary heat exchanger continues to operate provides a significantly lesser amount of heat output by the heater. Operation of valve 78 so that the fresh air supplied to inlet 62 bypasses the secondary heat exchanger 70 with the valve 58 remaining in its closed position provides minimum heat output. Also, burner 24 is throttled so that operation thereof is responsive to the gas flow rate through the first path 22 along which the burner is disposed.

While the best mode for carrying out the invention has herein been described in detail, those familiar with the art to which this invention relates will recognize various alternative designs and embodiments for practicing the invention as defined by the following claims.

What is claimed is:

1. A recirculating heater for processing ovens comprising: an elongated outer housing; an elongated inner housing received within the outer housing in a spaced relationship thereto so as to define a first gas flow path through the inner housing and a second gas flow path between the outer and inner housings; a burner at the upstream end of the inner housing along the first path to provide heating of gas flowing therealong; a mixing member of a conical shape located at the downstream end of the inner housing and pointing upstream toward the burner so as to deflect gas flowing along the first path outwardly toward gas flowing along the second path; a mixing chamber defined by the outer housing downstream from the conical mixing member such that gas from the first and second paths is mixed therein; a blower within the mixing chamber for drawing gas through the first and second gas flow paths; an internal heat exchanger located within the inner housing between the burner and the conical mixing member so as to extract heat from the gas flowing along the first path; and a supply conduit for delivering gas carrying the heat extracted by the heat exchanger to the upstream end of one of the flow paths such that the gas temperature within the inner housing upstream from the heat exchanger can be sufficiently high to provide thermal incineration of combustible pollutants while still delivering gas of a much lower temperature from the heater.

2. A heater as in claim 1 wherein said conduit feeds the gas carrying the heat extracted by the internal heat exchanger to the upstream end of the first flow path.

3. A heater as in claim 1 further including a control valve located along the first flow path between the internal heat exchanger and the conical mixing member so as to control the relative gas flow rates along the first and second flow paths.

4. A heater as in claim 3 further including a fresh air inlet to the heater at the mixing chamber, a control valve for the fresh air inlet, and an exhaust gas outlet for removing gas from the first flow path adjacent the control valve therealong.

5. A heater as in claim 4 further including a secondary heat exchanger for extracting heat from the exhaust gases that flow outwardly through the outlet and for supplying this heat to the fresh air supplied through the inlet.

6. A heater as in claim 5 wherein the exhaust gas outlet which feeds the secondary heat exchanger has an annular shape extending about the control valve along the first flow path.

7. A heater as in claim 5 further including a bypass conduit for feeding the inlet without receiving heat from the secondary heat exchanger, and a control valve for controlling the flow of fresh air through the secondary heat exchanger and the bypass conduit.

8. A heater as in claims 1 or 7 further including a central baffle and at least one annular baffle along the first flow path between the burner and the internal heat exchanger.

9. A recirculating heater for processing ovens comprising: an elongated outer housing; an elongated inner housing received within the outer housing in a spaced relationship thereto so as to define a first gas flow path through the inner housing and a second gas flow path between the outer and inner housings; a burner at the upstream end of the inner housing along the first path to provide heating of gas flowing therealong; a mixing member of a conical shape located at the downstream end of the inner housing and pointing upstream toward the burner so as to deflect gas flowing along the first path outwardly toward gas flowing along the second path; a mixing chamber defined by the outer housing downstream from the conical mixing member such that gas from the first and second paths is mixed therein; a blower within the mixing chamber for drawing gas through the first and second gas flow paths; an internal heat exchanger located within the inner housing between the burner and the conical mixing member so as to extract heat from the gas flowing along the first path; a conduit for delivering gas carrying the heat extracted by the internal heat exchanger to the upstream end of one of the flow paths such that the gas temperature within the inner housing upstream from the heat exchanger can be sufficiently high to provide thermal incineration of combustible pollutants while still delivering gas of a much lower temperature from the heater; a fresh air inlet to the heater at the mixing chamber; an exhaust gas outlet for removing gas from the first flow path at a location between the internal heat exchanger and the mixing member; and a secondary heat exchanger for extracting heat from the gas exhausted through the outlet and for supplying this heat to fresh air supplied through the inlet.

10. A recirculating heater for processing ovens comprising: an elongated outer housing with a round cross section; an elongated inner housing with a round cross section received within the outer housing in a spaced relationship thereto and concentric therewith so as to define a first gas flow path of a round cross section through the inner housing and a second gas flow path of an annular cross section between the outer and inner housings; a burner at the upstream end of the inner housing along the first path to provide heating of gas flowing therealong; a mixing member of a conical shape located at the downstream end of the inner housing and pointing upstream toward the burner so as to deflect gas flowing along the first path outwardly toward gas flowing along the second path; a mixing chamber defined by the outer housing downstream from the conical mixing member such that gas from the first and second paths is mixed therein; a blower within the mixing chamber for drawing gas through the first and second gas flow paths; an internal heat exchanger located within the inner housing between the burner and the conical mixing member so as to extract heat from the gas flowing along the first path; a supply conduit for delivering gas carrying the heat extracted by the heat exchanger to the upstream end of the first flow path such that the gas temperature within the round inner housing upstream from the heat exchanger can be sufficiently high to provide thermal incineration of combustible pollutants while still delivering gas of a much lower temperature from the heater; a control valve located between the internal heat exchanger and the conical mixing member so as to control the relative gas flow rates along the first and second paths; a fresh air inlet to the heater at the mixing chamber; an exhaust gas outlet of an annular shape located along the first flow path with the control valve received thereby so as to exhaust gas from the first flow path in accordance with the adjusted condition of the control valve; and a secondary heat exchanger for extracting heat from the gas exhausted through the outlet and for supplying this heat to fresh air supplied through the inlet.

11. A heater as in claim 10 further including a control valve for the fresh air inlet.

12. A heater as in claim 10 or 11 further including a bypass conduit for feeding fresh air to the inlet without receiving heat from the secondary heat exchanger, a control valve for controlling the flow of fresh air through the secondary heat exchanger and the bypass conduit, and a coupling between the control valve along the first flow path and the control valve that controls fresh air flow through the secondary heat exchanger and the bypass conduit.

* * * * *